(12) United States Patent
Sugg et al.

(10) Patent No.: US 10,954,995 B2
(45) Date of Patent: Mar. 23, 2021

(54) SOCKET ASSEMBLY AND METHOD OF MAKING

(71) Applicant: Federal-Mogul Motorparts LLC, Southfield, MI (US)

(72) Inventors: Brennan Sugg, Maplewood, MO (US); Glen Parker, St. Peters, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 444 days.

(21) Appl. No.: 15/912,777

(22) Filed: Mar. 6, 2018

(65) Prior Publication Data
US 2019/0277335 A1    Sep. 12, 2019

(51) Int. Cl.
*F16C 11/08* (2006.01)
*F16C 11/06* (2006.01)

(52) U.S. Cl.
CPC .......... *F16C 11/086* (2013.01); *F16C 11/068* (2013.01); *F16C 11/0623* (2013.01); *F16C 11/0633* (2013.01); *F16C 11/0642* (2013.01); *F16C 11/0685* (2013.01); *F16C 2326/05* (2013.01); *F16C 2326/24* (2013.01)

(58) Field of Classification Search
CPC .............. F16C 11/0623; F16C 11/0633; F16C 11/0642; F16C 11/068; F16C 11/0685; F16C 11/086; F16C 2326/05; F16C 2326/24; F16C 11/0625; F16C 11/0638; Y10T 403/32713; Y10T 403/32721; Y10T 403/32729; Y10T 403/32737
USPC .......................................................... 403/135
See application file for complete search history.

(56) References Cited

U.S. PATENT DOCUMENTS

| | | | |
|---|---|---|---|
| 2,507,087 A * | 5/1950 | Booth | F16C 11/086 403/36 |
| 2,921,809 A * | 1/1960 | Kogstrom | F16C 11/068 403/134 |
| 2,976,093 A | 3/1961 | Reiling | |

(Continued)

FOREIGN PATENT DOCUMENTS

| | | | | |
|---|---|---|---|---|
| DE | 102007041356 A1 | | 3/2009 | |
| GB | 1260144 A | * | 1/1972 | .......... F16C 11/0633 |

(Continued)

OTHER PUBLICATIONS

International Search Report, dated May 17, 2019 (PCT/US2019/020888.

*Primary Examiner* — Amber R Anderson
*Assistant Examiner* — Alexus Camero
(74) *Attorney, Agent, or Firm* — Dickinson Wright PLLC

(57) ABSTRACT

The socket assembly includes a housing with an inner bore which extends along a central axis from a generally closed first end to an open second end. A ball portion of a ball stud is received in the inner bore of the housing. The ball stud also has a shank portion which projects out of the inner bore through the open second end. A backing bearing is disposed in the inner bore of the housing and has a curved bearing surface that is in slidable contact with the ball portion of the ball stud. The backing bearing is movable in a radial direction relative to the housing and includes a polymeric piece. The backing bearing further includes a reinforcement piece, which is made of metal, and the reinforcement piece is at least partially embedded within the polymeric piece to resist radial expansion of the polymeric piece.

12 Claims, 8 Drawing Sheets

(56) References Cited

U.S. PATENT DOCUMENTS

| | | | | |
|---|---|---|---|---|
| 4,163,617 | A * | 8/1979 | Nemoto | F16C 11/0642 403/132 |
| 4,750,885 | A * | 6/1988 | Ito | F16C 11/0638 403/133 |
| 5,380,114 | A * | 1/1995 | Urbach | F16C 11/06 403/134 |
| 5,609,433 | A | 3/1997 | Pazdirek et al. | |
| 5,697,723 | A * | 12/1997 | Wood | F16C 11/0638 403/135 |
| 5,997,208 | A * | 12/1999 | Urbach | F16C 11/0633 403/133 |
| 6,012,847 | A | 1/2000 | Kahle | |
| 6,422,779 | B1 * | 7/2002 | Spagnuolo | B62D 3/12 403/138 |
| 8,047,739 | B2 * | 11/2011 | Sellers | F16C 11/069 403/135 |
| 8,714,571 | B2 * | 5/2014 | Nataraj | B60G 7/001 280/124.107 |
| 9,291,195 | B1 * | 3/2016 | Parker | F16C 11/069 |
| 9,765,811 | B2 * | 9/2017 | Karpman | F16C 11/0685 |
| 2002/0031396 | A1 * | 3/2002 | Parker | B62D 7/16 403/137 |
| 2005/0111908 | A1 * | 5/2005 | Green | B62D 7/166 403/132 |
| 2005/0207684 | A1 * | 9/2005 | Lu | F16C 11/0638 384/192 |
| 2005/0235476 | A1 * | 10/2005 | Spence | F16C 11/086 29/446 |
| 2009/0080967 | A1 | 3/2009 | Gercke | |
| 2011/0103883 | A1 * | 5/2011 | Seol | F16C 11/0638 403/135 |
| 2014/0086667 | A1 * | 3/2014 | Elterman | F16C 11/0633 403/122 |

FOREIGN PATENT DOCUMENTS

| | | | | |
|---|---|---|---|---|
| JP | | 2011141020 A | 7/2011 | |
| JP | | 2011141020 A * | 10/2011 | F16C 11/0638 |

* cited by examiner

SOCKET ASSEMBLY AND METHOD OF MAKING

BACKGROUND OF THE INVENTION

1. Field of the Invention

The present invention is related, generally, to socket assemblies and, more particularly, to compression loaded socket assemblies with a backing bearing.

2. Related Art

Socket assemblies of the type that are used in vehicle suspension and steering systems typically include a housing, a ball stud and one or more bearings which allow the ball stud to articulate and rotate relative to the housing. The bearings are typically made of either metal or a hard plastic material. Such socket assemblies may be radially, compression and/or tension loaded. In compression loaded socket assemblies, extremely tight dimensional tolerances for the bearings, housing and ball stud are typically required and, if one or more components are out of tolerance, damage to one of the bearings could occur and/or the ball stud could become locked with the housing, thereby preventing rotation and/or articulation of the ball stud. At least one solution has been developed which allows for looser tolerances of the components in a compression loaded socket assembly, but the bearings in that solution are made of metal.

SUMMARY OF THE INVENTION AND ADVANTAGES

One aspect of the present invention is related to a socket assembly that includes a housing with an inner bore which extends along a central axis from a generally closed first end to an open second end. A ball portion of a ball stud is received in the inner bore of the housing. The ball stud also has a shank portion which projects out of the inner bore through the open second end. A backing bearing is disposed in the inner bore of the housing and has a curved bearing surface that is in slidable contact with the ball portion of the ball stud. The backing bearing is movable in a radial direction relative to the housing and includes a polymeric piece. The backing bearing further includes a reinforcement piece, which is made of metal, and the reinforcement piece is at least partially embedded within the polymeric piece to resist radial expansion of the polymeric piece.

The reinforcement piece functions to support and restrict radial expansion of the plastic piece when the ball stud is loaded against the backing bearing, thereby improving the durability of the socket assembly. Thus, the reinforcement piece allows the backing bearing to be mostly made of plastic, which provides cost and mass (weight) savings as compared to all metal backing bearings without sacrificing durability. The weight savings are particularly valuable in a vehicle because such socket assemblies are unsprung mass.

According to another aspect of the present invention, the reinforcement piece is generally cup-shaped.

According to yet another aspect of the present invention, the reinforcement piece includes an annular outer wall and an annular inner wall that is spaced radially inwardly from the annular outer wall, and the reinforcement piece further includes a bottom wall which extends between the annular inner and outer walls.

According to still another aspect of the present invention, the reinforcement piece includes a plurality of radially extending ribs.

According to a further aspect of the present invention, the radially extending ribs extend from the inner wall to the outer wall.

According to yet a further aspect of the present invention, the radially extending ribs are generally equally spaced from one another in a circumferential direction.

According to still a further aspect of the present invention, the outer wall has a first axial length, and the inner wall has a second axial length which is less than the first axial length.

According to another aspect of the present invention, the reinforcement piece is cylindrically shaped with only a single wall.

According to yet another aspect of the present invention, the reinforcement piece is a single strip which is bent into an annular shape.

According to still another aspect of the present invention, the reinforcement piece is made of a powdered metal or stamped steel.

According to a further aspect of the present invention, only the polymeric piece of the backing bearing contacts the ball portion of the ball stud, and the reinforcement piece does not contact the ball portion of the ball stud.

According to yet a further aspect of the present invention, the curved bearing surface of the backing bearing is a first curved bearing surface, an exit bearing with a second curved bearing surface is disposed in the inner bore of the housing, and the second curved bearing surface is in slidable contact with the ball portion of the ball stud.

According to still a further aspect of the present invention, the housing is deformed adjacent the open first end to capture the backing bearing, the ball portion, and the exit bearing in the inner bore.

According to another aspect of the present invention, a spring biases the second curved bearing surface of the exit bearing against the ball portion of the ball stud.

Another aspect of the present invention is related to a method of making a socket assembly. The method includes the steps of inserting a reinforcement piece that is made of metal into a mold. The method proceeds with the step of overmolding a plastic piece into engagement with the reinforcement piece. The method continues with the step of preparing a housing that has an inner bore which extends along a central axis from a generally closed first end to an open second end. The method proceeds with the step of inserting the backing bearing into the inner bore of the housing through the open second end and wherein, when in position, the backing bearing is movable within the inner bore in a radial direction relative to the housing. The method continues with the step of inserting a ball portion of a ball stud into the inner bore of the housing through the open second end and establishing slidable contact between the ball portion of the ball stud and a curved bearing surface of the plastic piece of the backing bearing.

According to another aspect of the present invention, the reinforcement piece includes an annular outer wall and an annular inner wall and a bottom wall that extends between the annular inner and outer walls.

According to yet another aspect of the present invention, the reinforcement piece further includes a plurality of ribs which are spaced circumferentially from one another and which extend between the annular inner and outer walls.

According to still another aspect of the present invention, the method further includes the step of bending a strip of metal into an annular shape to form the reinforcement piece.

According to a further aspect of the present invention, the plastic piece of the bearing has a first curved bearing surface, and the method further includes the steps of inserting an exit bearing into the inner bore of the housing and establishing slidable contact between a second curved bearing surface of the exit bearing and the ball portion of the ball stud.

According to yet a further aspect of the present invention, the method further includes the step of deforming the housing adjacent the open second to capture the backing bearing, the ball portion, and the exit bearing in the inner bore.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
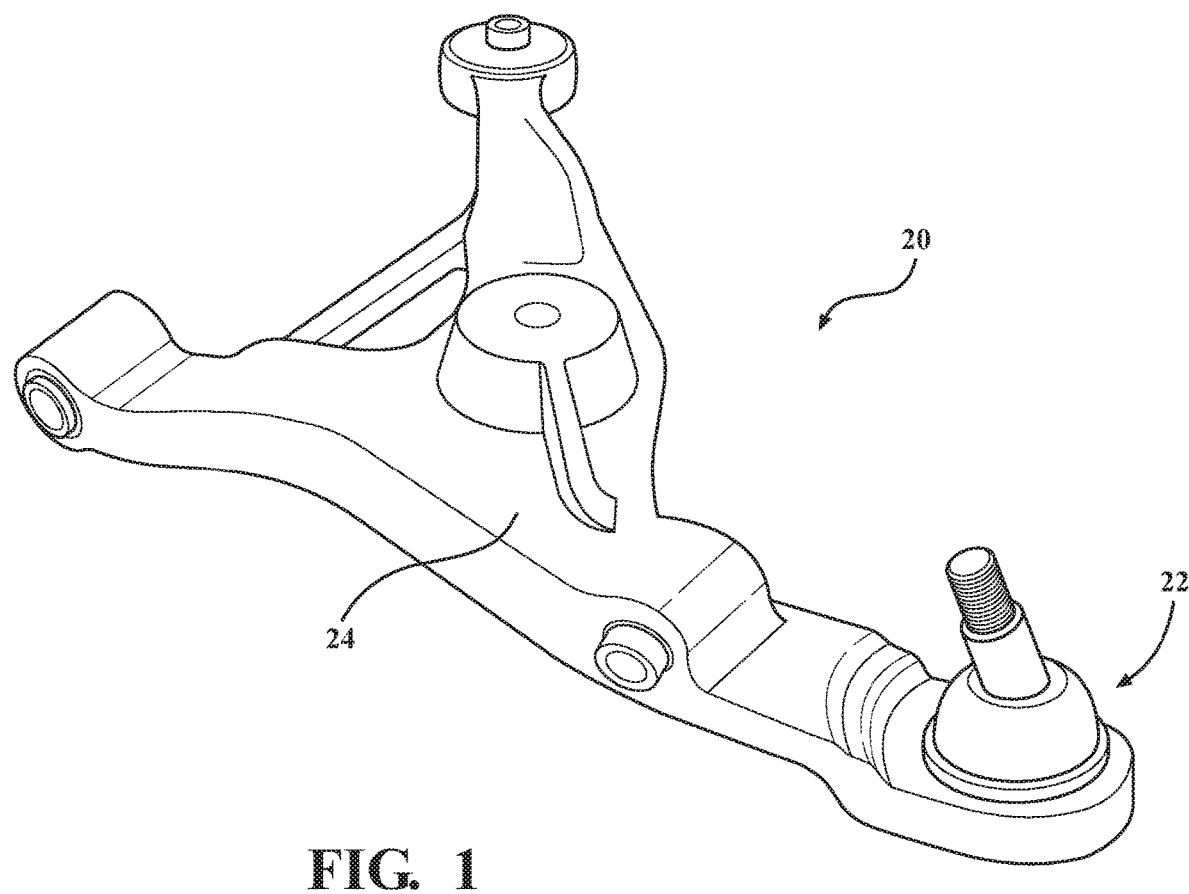
FIG. 1 is a perspective view of a control arm assembly including a first exemplary embodiment of an improved socket assembly.

Referring to the Figures, wherein like numerals indicate corresponding parts throughout the several views, a control arm assembly 20 which includes a first exemplary embodiment of an improved socket assembly 22 is generally shown in FIG. 1. In the exemplary embodiment, the socket assembly 22 is a compression loaded ball joint which is configured to join a control arm body 24 with a knuckle (not shown) in a vehicle suspension assembly. Although shown as a component of a control arm assembly 20 for a vehicle suspension system, it should be appreciated that the socket assembly 22 could find uses in a wide range of automotive and non-automotive applications.

Figure 2:
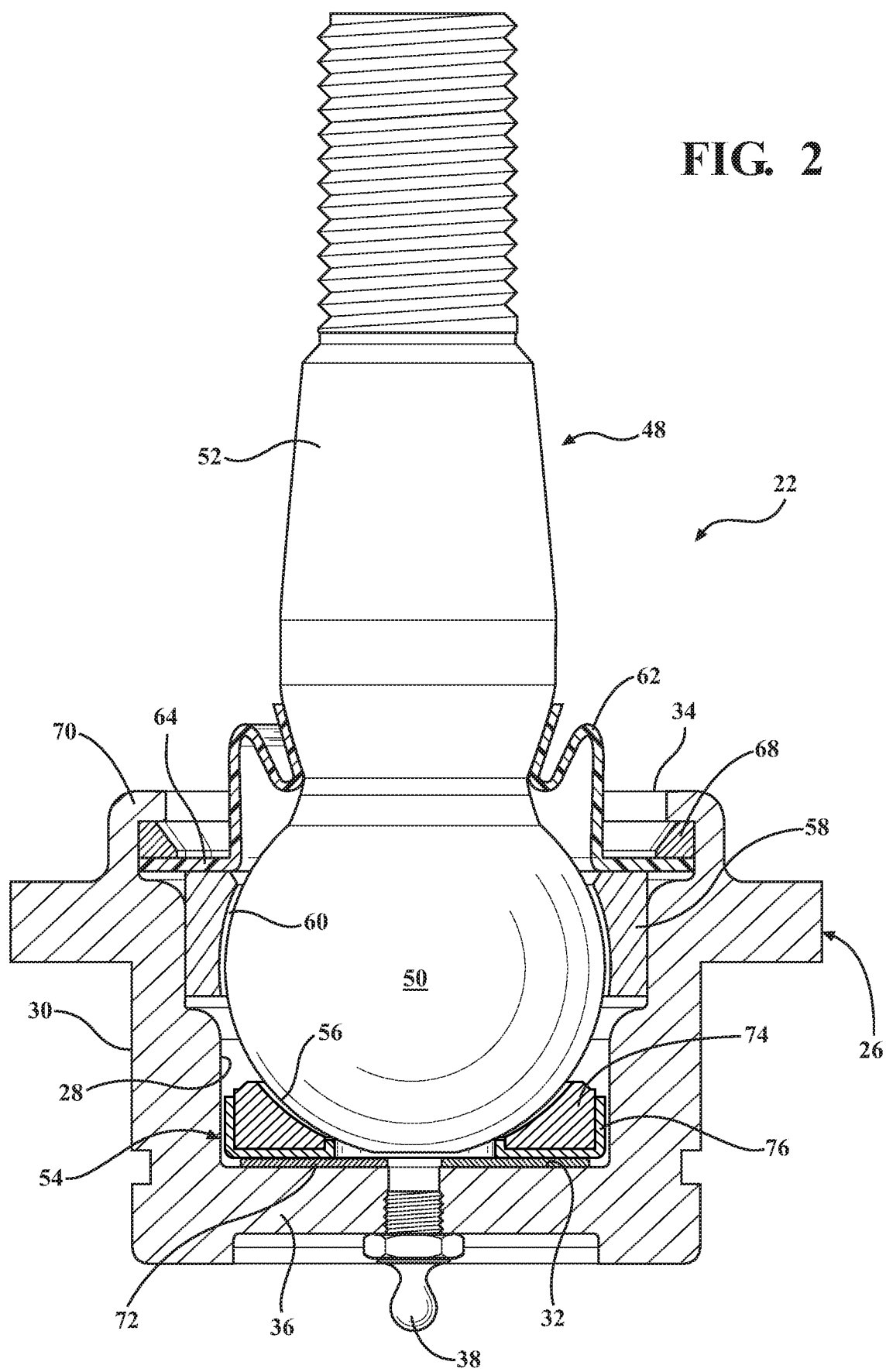
FIG. 2 is a partially cross-sectional view of the first exemplary embodiment of the improved socket assembly.
Figure 3:
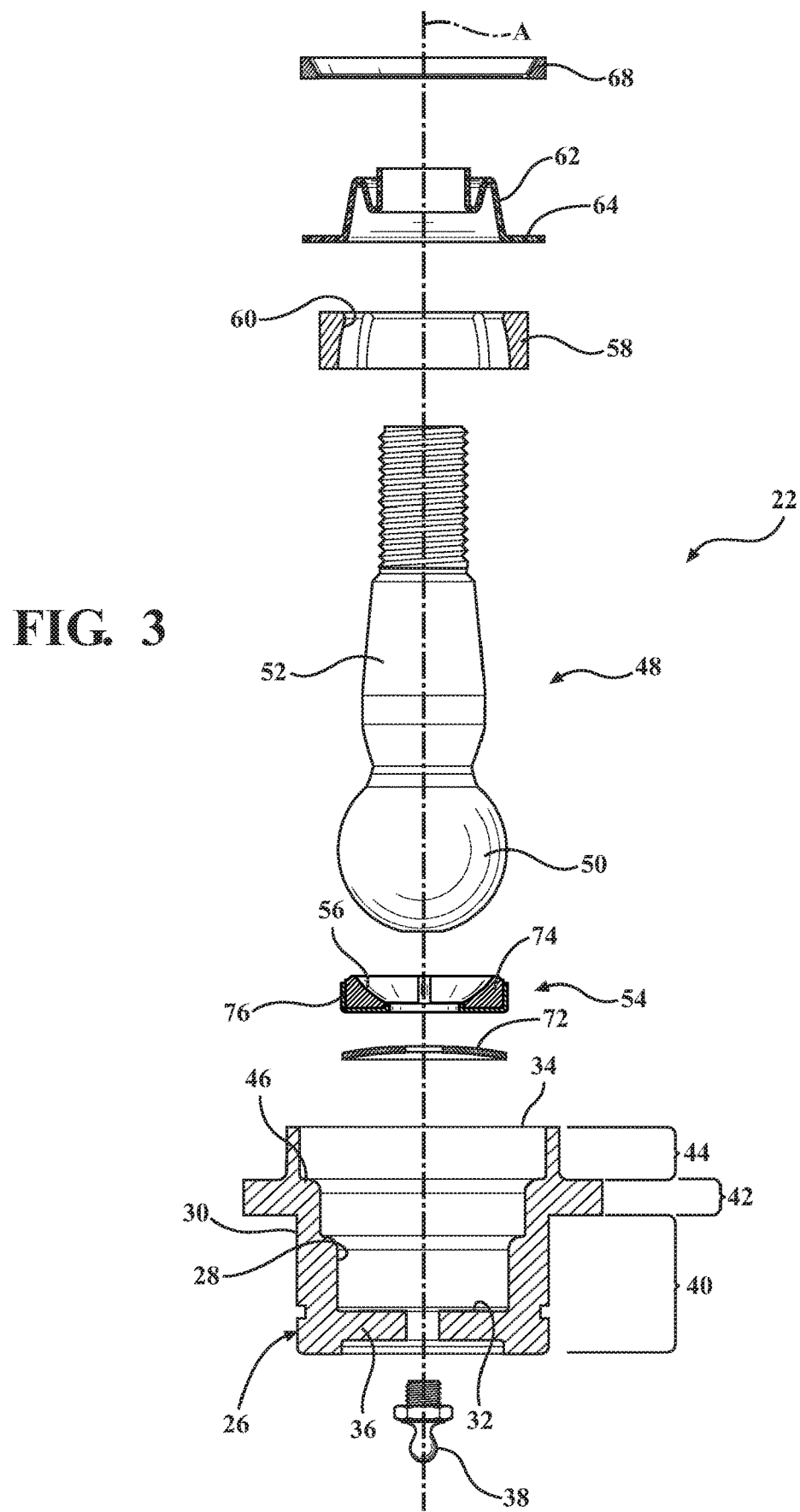
FIG. 3 is a partially cross-sectional view and exploded view of the first exemplary embodiment of the improved socket assembly.
Figure 4:
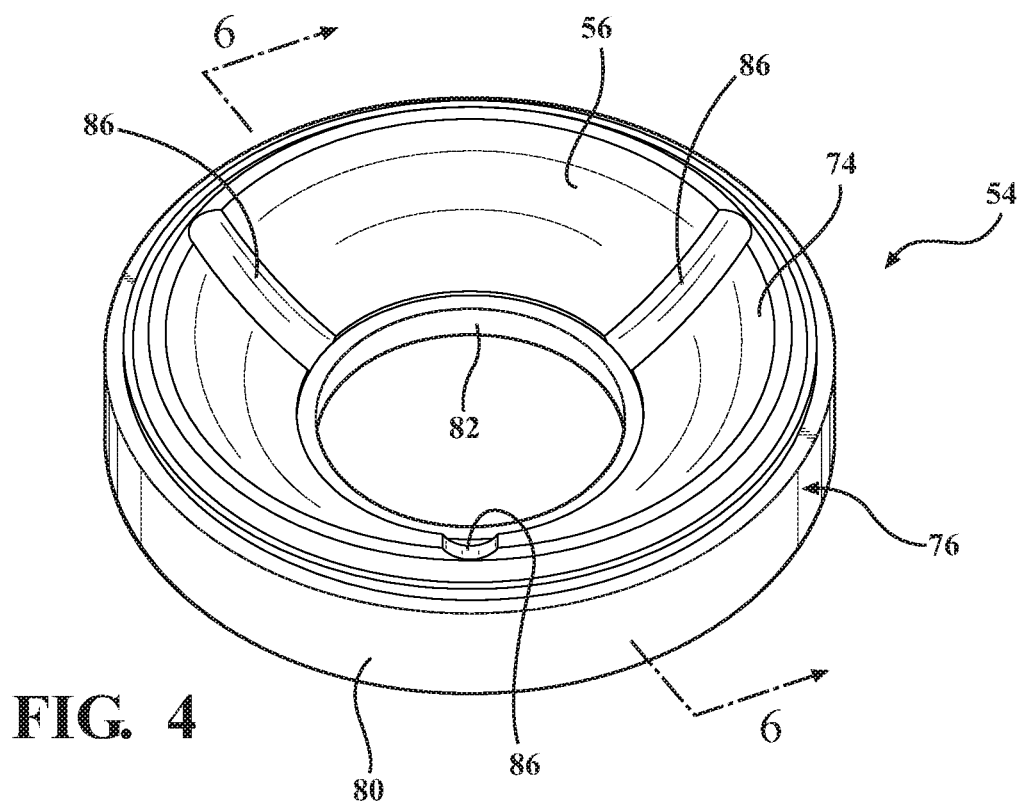
FIG. 4 is a perspective view of a backing bearing of the first exemplary embodiment of the improved socket assembly.

Referring now to FIGS. 2-4, the socket assembly 22 includes a housing 26 which has an inner surface 28 and an outer surface 30. The inner surface 28 surrounds an inner bore that extends along a central axis A from a generally closed first end 32 to an open second end 34. At the closed first end 32, the housing 26 has a lower wall 36 with a lubricant opening which receives a grease fitting 38 (also known as a Zerk fitting) for channeling a lubricant, such as grease, into the inner bore. The housing 26 is preferably made as a monolithic piece of a metal, such as steel or a steel alloy, and may be shaped through any suitable process or combination of processes including, for example, forging, casting, machining from a billet, etc. In the exemplary embodiment, the housing 26 is a cartridge-style housing 26 in that it is configured to be inserted into an opening of another component. However, it should be appreciated that the housing 26 could alternately be made as a single piece with the other component, such as the control arm body 24 or a tie rod end (not shown).

As shown in FIG. 2, the inner bore of the housing 26 has a progressively increasing diameter from the closed first end 32 to the open second end 34. Specifically, the inner bore has a first portion 40 with a generally constant first diameter adjacent the closed first end 32, a second portion 42 where the inner surface 28 of the housing 26 is curved (but could alternately be straight), and a third portion 44 with a generally constant second diameter adjacent the open second end 34. As shown, the second diameter of the third portion 44 is greater than the first diameter of the first portion 40. Between the second and third portions 42, 44 of the inner bore, the housing 26 presents a shoulder 46 which faces towards the open second end 34.

The socket assembly 22 further includes a ball stud 48 with a ball portion 50 and a shank portion 52. The ball portion 50 is fully disposed in the inner bore of the housing 26, and the shank portion 52 projects out of the inner bore through the open second end 34. The ball portion 50 has a generally semi-spherically curved outer face which may have one or more lubricant grooves formed thereon. The ball stud 48 is preferably made as a single, monolithic piece of metal, such as steel or an alloy steel and may be shaped through any suitable process.

A backing bearing 54 is received in the first portion 40 of the inner bore between the ball portion 50 of the ball stud 48 and the lower wall 36 of the housing 26. The backing bearing 54 has a semi-spherically curved first bearing surface 56 which faces axially towards the second open end 34 of the housing 26. The curvature of the first bearing surface 56 is similar to the curvature of the ball portion 50 such that the ball portion 50 can slide along the first bearing surface 56. As shown in FIG. 2, in the exemplary embodiment, the first bearing surface 56 in has a lubricant opening that is aligned with the lubricant opening in the lower wall 36 of the housing 26 so that the lubricant can access the interface between the ball portion 50 and the first bearing surface 56. The first bearing surface 56 also has a plurality of lubricant grooves for distributing the lubricant across the first bearing surface 56.

The socket assembly 22 also has an exit bearing 58 which is received in the second portion 42 of the inner bore. The exit bearing 54 has a semi-spherically curved second bearing surface 60 which has a similar radius of curvature as the ball portion 50 and the first bearing surface 56. The first and second bearing surfaces 56, 60 of the backing and exit bearings 54, 58 respectively slidably contact opposite hemispheres of the ball portion 50 to allow the ball stud 48 and housing 26 to freely articulate and rotate relative to one another. As shown in FIG. 2, the exit bearing 58 is spaced axially from the backing bearing 54 within the inner bore of the housing 26.

The socket assembly 22 further includes a dust boot 62 which is made of an elastomeric material (such as rubber) and is sealed against the housing 26 and the shank portion 52 of the ball stud 48 for capturing the lubricant within and keeping contaminants out of the inner bore. The dust boot 62 extends from a first boot end, which has a radially outwardly extending flange 64, to a second boot end that is sealed against the shank portion 52 of the ball stud 48. The flange 64 is disposed in the third portion 44 of the inner bore of the housing 26 and is in surface-to-surface contact with a top surface of the exit bearing 58.

A cover plate 68 is positioned in the third portion 44 of the inner bore on an opposite side of the flange 64 on the dust boot 62. The open second end 34 of the housing 26 is bent (such as through staging) to create a radially inwardly extending lip 70 that engages the cover plate 68 to capture the cover plate 68, flange 64 of the dust boot 62, exit bearing 58, ball portion 50 and backing bearing 54 within the inner bore of the housing 26.

A spring 72 in the form of a Belleville washer 72 (also known as a washer spring) is disposed in the inner bore and is sandwiched between the backing bearing 54 and the lower wall 36. As shown in FIG. 2, the spring 72 is elastic ally compressed to exert an axial biasing force onto the backing bearing 54 to preload the curved first bearing surface 56 of the backing bearing 54 against the ball portion 50 of the ball stud 48, thereby maintaining the slidable contact between the backing bearing 54 and the ball portion 50 as these components wear during use of the socket assembly 22.

The backing bearing 54 has an outer diameter that is less than the first diameter $D_1$ of the first portion 40 of the inner bore such that the footprint, or outer perimeter, of the backing bearing 54, as viewed in cross-section, is smaller than the footprint of the first portion 40 of the inner bore. Thus, when the backing bearing 54 is received in the first portion 40 of the inner bore, there exists an annular gap between the backing bearing 54 and the inner surface 28 of the housing 26. The gap allows the backing bearing 54 allows the backing bearing 54 to move, or float, in a radial direction, within the inner bore.

Figure 5:
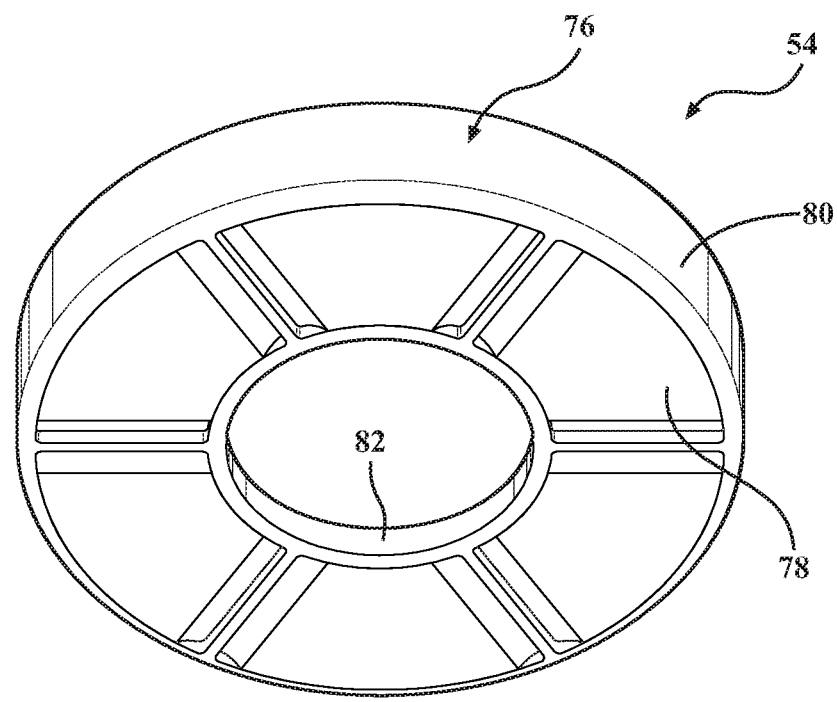
FIG. 5 is a perspective view of the backing bearing of the first exemplary embodiment of the improved socket assembly taken from a different perspective than FIG. 4.

The movability of the backing bearing 54 within the inner bore of the housing 26 allows for relaxed tolerances for the various components of the socket assembly 22 without compromising the performance of the socket assembly 22. For example, in the embodiment shown in FIG. 5, the exit bearing 58 is asymmetrical, and in FIG. 6, the backing bearing 54 itself is asymmetrical. In each of these cases, the backing bearing 54 has moved radially to account for the asymmetry and allow the ball portion 50 to evenly contact both of the first and second bearing surfaces 56, 60 of the backing and exit bearings 54, 58 respectively. In each of these examples, if the backing bearing 54 was unable to float within the inner bore, there would at least be uneven loading of the ball portion 50 on one or both of the bearings 54, 58 or the ball stud 48 could possibly become locked with the bearings 54, 58 and be unable to articulate or rotate relative to the housing 26.

Figure 6:
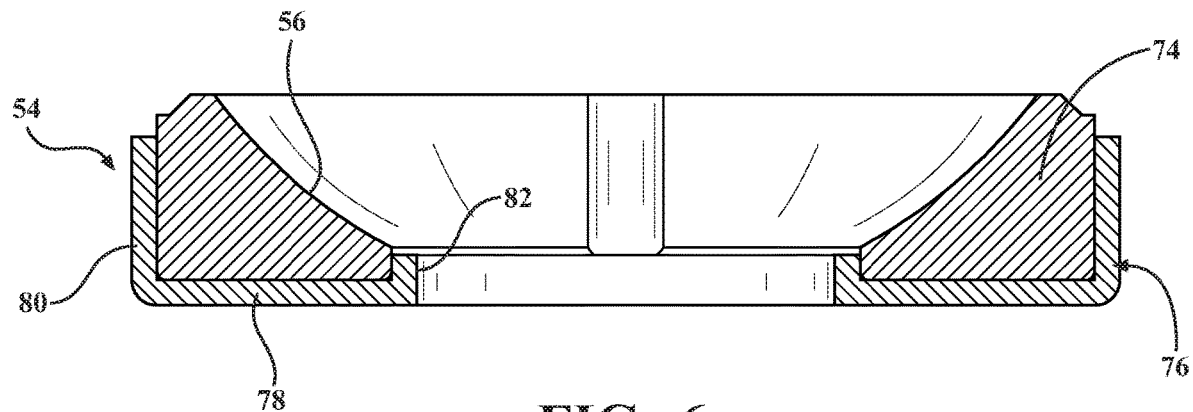
FIG. 6 is a cross-sectional view of the backing bearing of FIGS. 4 and 5 and taken along Line 6-6 of FIG. 4.
Figure 7:
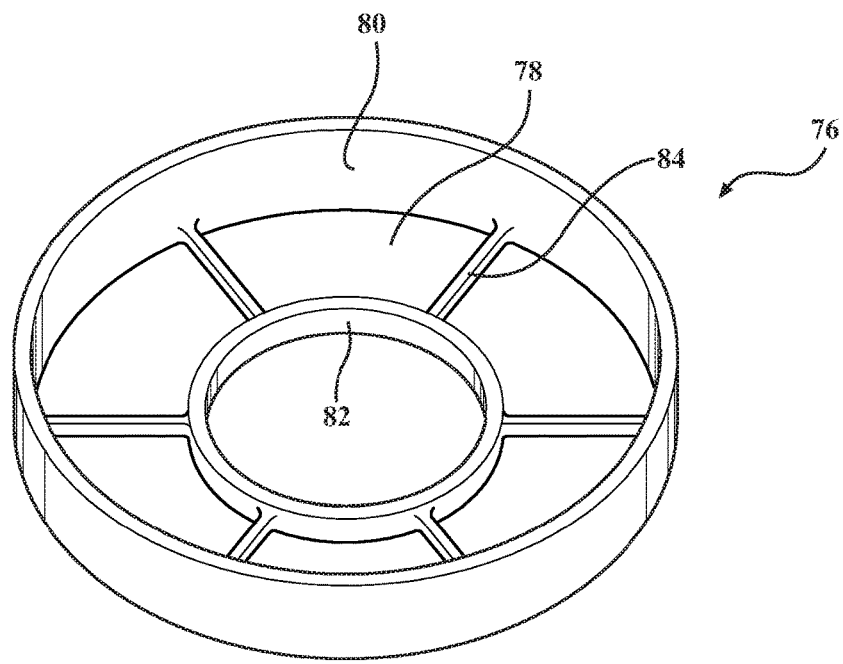
FIG. 7 is a perspective view of a reinforcement piece of the backing bearing of FIGS. 4-6.
Figure 8:
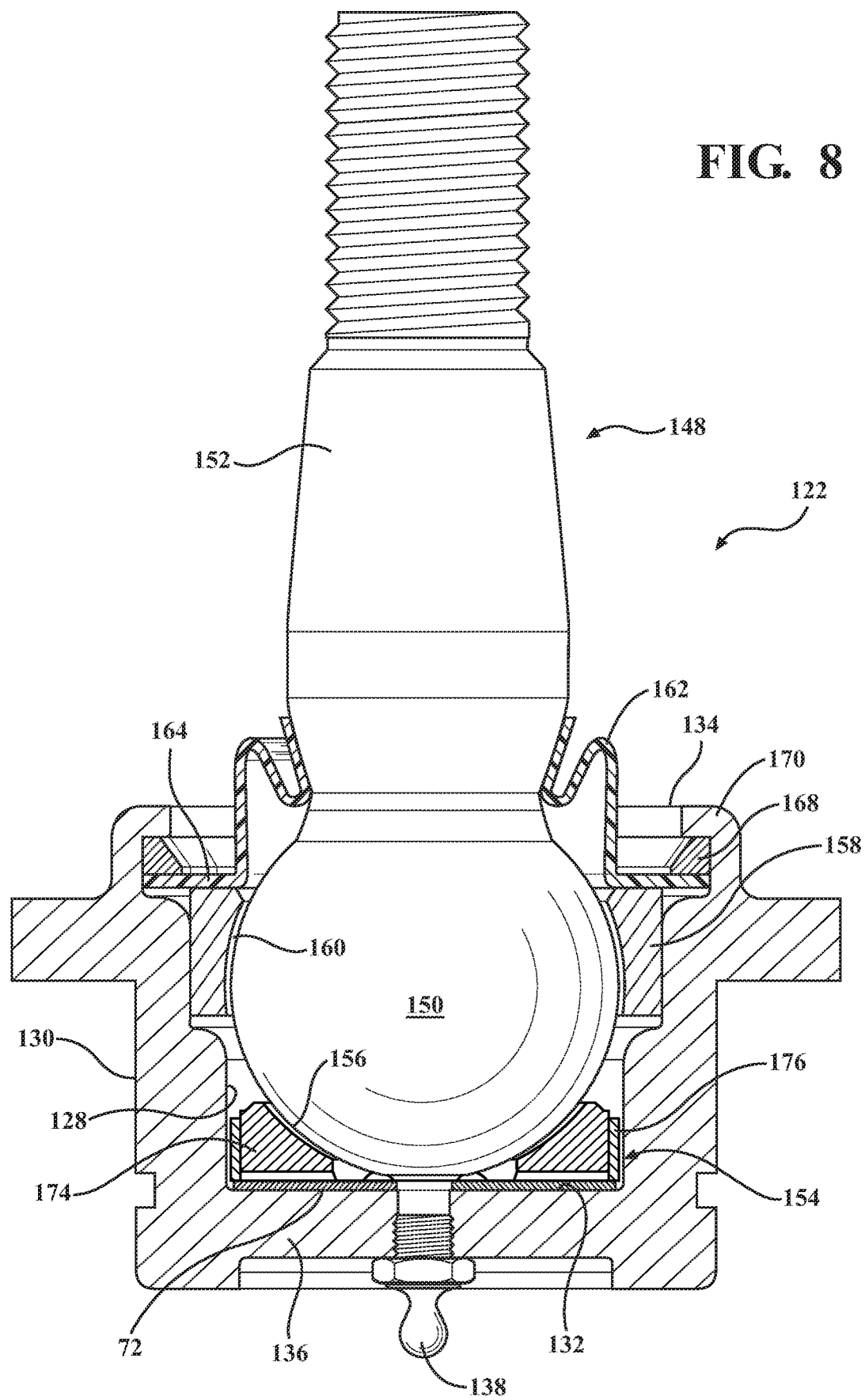
FIG. 8 is a partially cross-sectional view of a second exemplary embodiment of the improved socket assembly.
Figure 9:
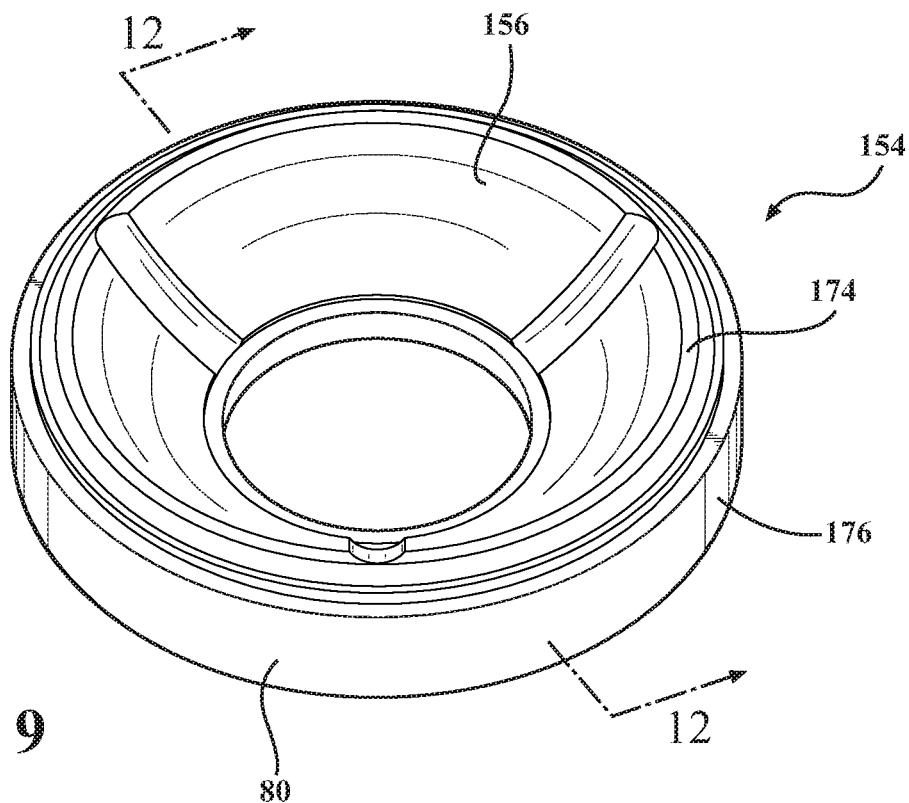
FIG. 9 is a perspective view of a backing bearing of the second exemplary embodiment of the improved socket assembly.
Figure 10:
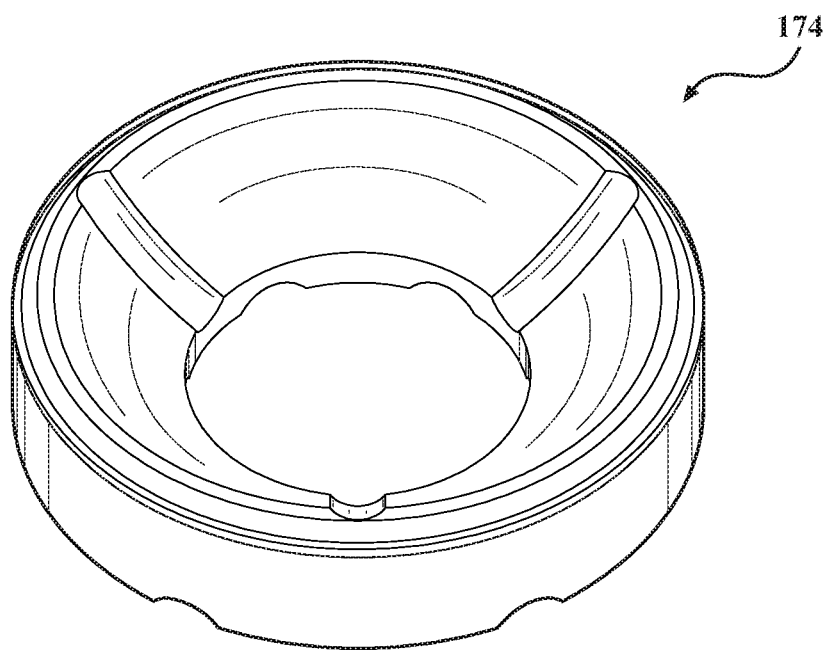
FIG. 10 is a perspective view of a polymeric piece of the backing bearing of FIG. 9.
Figure 11:
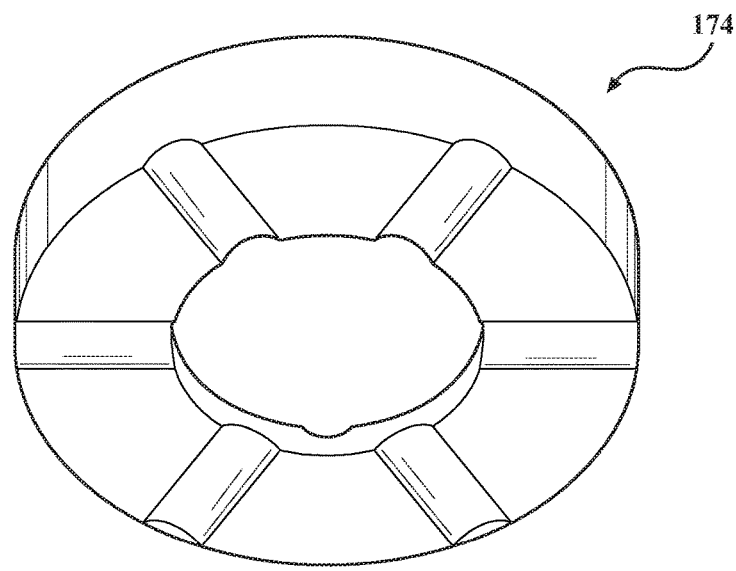
FIG. 11 is a perspective view of the polymeric piece of the backing bearing of FIG. 9 and taken from a different view than FIG. 10.
Figure 12:
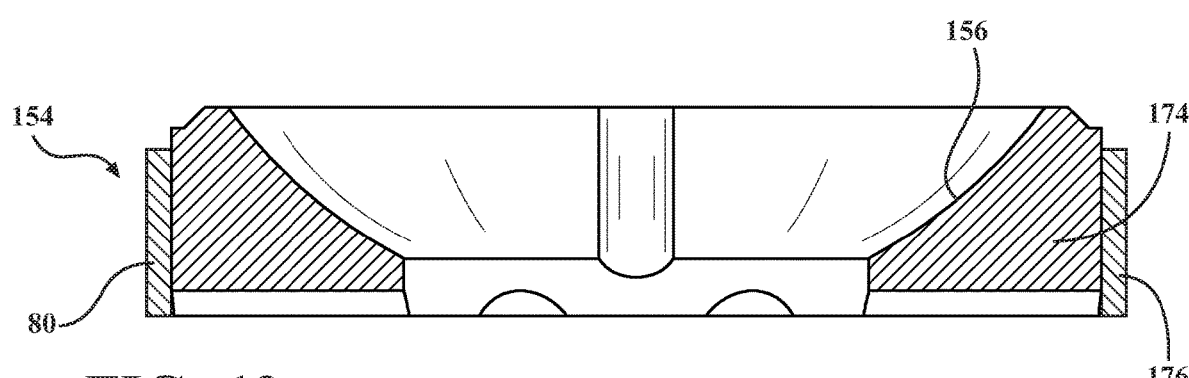
FIG. 12 is a cross-sectional view of the backing bearing of FIG. 9 taken through Line 12-12 of FIG. 9.
Figure 13:
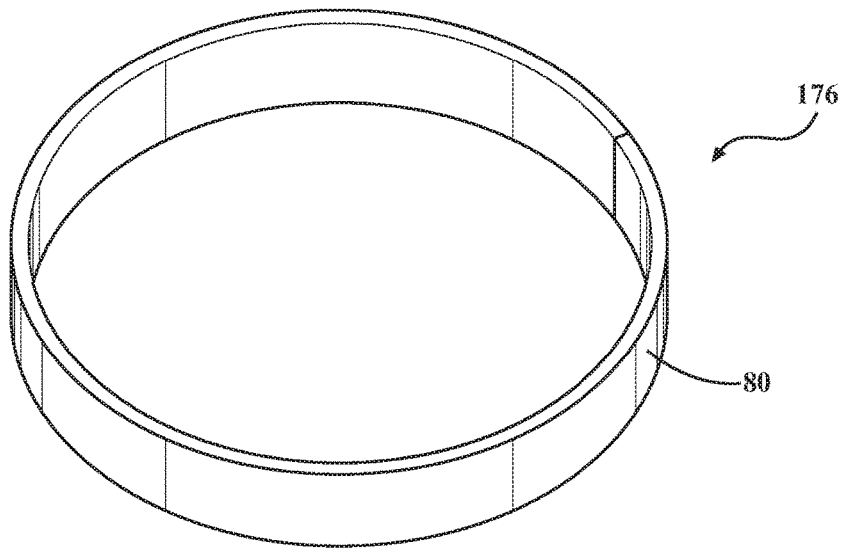
FIG. 13 is a perspective view of a reinforcement piece of the backing ebaring of FIG. 9.

As shown in FIG. 6, the backing bearing 54 includes a polymeric (specifically, plastic) piece 74 and a metal reinforcement piece 76. The plastic piece 74 includes the first bearing surface 56, and thus, only the plastic piece 74 contacts the ball portion 50 (shown in FIG. 2) of the ball stud 48. The plastic and reinforcement pieces 74, 76 are fixedly attached with one another via an injection molding operation to establish a strong and permanent connection therebetween. The reinforcement piece 76 may be made of a powdered metal or a stamped steel.

In this embodiment, the reinforcement piece 76 is generally cup shaped in that it has a bottom wall 78 and an outer wall 80 (or outer ring) that extends upwardly from the bottom wall. The reinforcement piece 76 also has an inner wall 82 (or inner ring) that is spaced from the outer wall 80 and extends upwardly therefrom by a height (i.e., axial length) which is less than a height of the outer wall 80. The bottom wall 78 also has a plurality of ribs 84 which are circumferentially spaced from one another and which extend radially from the inner wall 82 to the outer wall 80. The ribs 84 all have heights that are less than both the outer and inner walls 80, 82, and the plastic piece 74 is overmolded directly around the ribs 84. As such, after overmolding the plastic piece 74 onto the reinforcement piece 76, the ribs 84 are at least partially embedded within the plastic material of the plastic piece 74.

A lower surface of the reinforcement piece 76 is provided with a plurality of circumferential spaced and radially extending lubricant grooves 86 for distributing the lubricant around the interface between the backing bearing 54 and the spring 72 to allow the backing bearing 54 to more freely move within the inner bore of the housing 26.

In operation, the metal reinforcement piece 76 reinforces the plastic piece 74 and restricts radial expansion of the plastic piece 74 when the ball stud 48 is loaded against the backing bearing 54. This improves the durability of the socket assembly 22 by reducing the risk of the plastic piece 74 cracking when under load. Thus, the presence of the metal reinforcement piece 76 allows the backing bearing 54 to be mostly made of plastic, which provides cost and mass (weight) savings as compared to all metal backing bearing designs. Also, unlike all metal bearing designs, at least the plastic piece 74, which is the only piece the contacts the ball stud 48, is not susceptible to corrosion.

Referring now to FIGS. 8-13, a second exemplary embodiment of the ball joint assembly 122, which has a different backing bearing 154 than the first exemplary embodiment, is generally shown with like numerals, separated by a prefix of "1", indicating corresponding parts with the first exemplary embodiment discussed above. In the second exemplary embodiment, the reinforcement piece 176 is a strip of sheet metal which is bent into an annular shape before the overmolding operation which fixedly attaches the plastic and reinforcement pieces 174, 176. Thus, the reinforcement piece 176 of this embodiment lacks a bottom wall or an inner wall but still is able to resist radial expansion of the plastic piece 174 when the ball stud 148 is under load.

Another aspect of the present invention is related to a method of making a socket assembly 22, 122, such as either of the first and second embodiments discussed above. With reference to the first embodiment, the method includes the steps of inserting the metal reinforcement piece 76 into a mold and overmolding the plastic piece 74 into engagement with the reinforcement piece 76. The method continues with the steps of inserting the backing bearing 54, then the ball portion 50 of the ball stud 48, then the exit bearing 58, then the flange 64 of the dust boot 62, and then the cover plate 68 into the inner bore of the housing 26 through the open second end 34 to establish slidable contact between the ball portion 50 and the curved first bearing surface 56 of the backing bearing 54. The method further includes the step of deforming the housing 26 adjacent the open second end 34 to capture the backing bearing 54, the ball portion 50 of the ball stud 48, the exit bearing 54, the flange 64 of the dust boot 62, and the cover plate 68 in the inner bore of the housing 26. In the case of the second embodiment, the method further includes the step of bending a strip of metal into an annular shape to form the reinforcement piece 176.

It should be appreciated that the use of the terms of direction, such as "upper", "lower", "bottom", and "top", as herein is in reference to one particular orientation of the socket assembly and is not considered to require this particular orientation.

Obviously, many modifications and variations of the present invention are possible in light of the above teachings and may be practiced otherwise than as specifically described while within the scope of the appended claims. Additionally, it is to be understood that all features of all claims and all embodiments can be combined with each other, as long as they do not contradict each other.

What is claimed is:

1. A socket assembly, comprising:
a housing having an inner bore which extends along a central axis from a closed first end to an open second end;
a ball stud including a ball portion and a shank portion;
said ball portion being received in said inner bore of said housing and said shank portion projecting out of said inner bore through said open second end;
a backing bearing disposed in said inner bore of said housing and having a curved bearing surface that is in slidable contact with said ball portion of said ball stud;
said backing bearing being movable in a radial direction relative to said housing;
said backing bearing including a polymeric piece;
said backing bearing further including a reinforcement piece made of metal and including a bottom wall and a cylindrical outer wall and a cylindrical inner wall, said cylindrical inner wall being spaced radially inwardly of said cylindrical outer wall, said cylindrical inner wall extending in the same axial direction away from said bottom wall as said cylindrical outer wall, and a plurality of ribs extending radially between said cylindrical outer wall and said cylindrical inner wall; and
said polymeric piece being overmolded directly over said ribs of said metal piece such that said ribs are at least partially embedded within said polymeric piece to resist radial expansion of said polymeric piece.

2. The socket assembly as set forth in claim 1 wherein said reinforcement piece is generally cup-shaped.

3. The socket assembly as set forth in claim 1 wherein said radially extending ribs are generally equally spaced from one another in a circumferential direction.

4. The socket assembly as set forth in claim 1 wherein said cylindrical outer wall has a first axial length and wherein said cylindrical inner wall has a second axial length which is less than said first axial length.

5. The socket assembly as set forth in claim 1 wherein said reinforcement piece is made of a powdered metal or stamped steel.

6. The socket assembly as set forth in claim 1 wherein only said polymeric piece of said backing bearing contacts said ball portion of said ball stud and said reinforcement piece does not contact said ball portion of said ball stud.

7. The socket assembly as set forth in claim 1 wherein said curved bearing surface of said backing bearing is a first curved bearing surface and further including an exit bearing with a second curved bearing surface that is in slidable contact with said ball portion of said ball stud.

8. The socket assembly as set forth in claim 7 wherein said housing is deformed adjacent said open first end to capture said backing bearing and said ball portion of said ball stud and said exit bearing in said inner bore.

9. The socket assembly as set forth in claim 8 further including a spring which biases said first curved bearing surface of said backing bearing against said ball portion of said ball stud.

10. A method of making a socket assembly, comprising the steps of:
inserting a reinforcement piece that is made of metal into a mold, the reinforcement piece including a bottom wall and a cylindrical outer wall and a cylindrical inner wall, the cylindrical inner wall being spaced radially inwardly of the cylindrical outer wall, the cylindrical inner wall extending in the same axial direction away from the bottom wall as the cylindrical outer wall, and a plurality of ribs extending radially between said cylindrical outer wall and said cylindrical inner wall;
overmolding a plastic piece into engagement with the reinforcement piece such that the ribs of the reinforcement piece are at least partially embedded within the plastic piece to resist radial expansion of the plastic piece;
preparing a housing with an inner bore which extends along a central axis from a closed first end to an open second end;
inserting a hacking bearing into the inner bore of the housing through the open second end and wherein the backing hearing is movable within the inner bore in a radial direction relative to the housing; and
inserting a ball portion of a bag stud into the inner bore of the housing through the open second end and establishing slidable contact between the ball portion of the ball stud and a curved bearing surface of the plastic piece of the backing bearing.

11. The method as set forth in claim 10 wherein the plastic piece of the bearing has a first curved bearing surface and further including the step of inserting an exit bearing into the inner bore of the housing and establishing slidable contact between a second curved bearing surface of the exit bearing and the ball portion of the ball stud.

12. The method as set forth in claim 11 further including the step of deforming the housing adjacent the open second end to capture the backing bearing and the ball portion of the ball stud and the exit bearing in the inner bore.

* * * * *